United States Patent [19]

Grot

[11] 3,940,916
[45] Mar. 2, 1976

[54] KNITTED OR WOVEN ION EXCHANGE FABRIC CONTAINING LOW DENIER FILAMENTS

[75] Inventor: Walther Gustav Grot, Chadds Ford, Pa.

[73] Assignee: E. I. Du Pont de Nemours and Company, Wilmington, Del.

[22] Filed: June 27, 1974

[21] Appl. No.: 483,570

[52] U.S. Cl. ............................. 57/140 R; 260/2.1 R
[51] Int. Cl.² ....................... D02G 3/02; D02G 3/04
[58] Field of Search .... 57/140 R, 140 BY; 264/184; 260/79.3 MU, 2.1 R; 28/76 T

[56] References Cited
UNITED STATES PATENTS

| 2,716,049 | 8/1955 | Latour | 28/76 T UX |
| 3,179,618 | 4/1965 | Roberts | 264/184 UX |
| 3,282,875 | 11/1966 | Connolly et al. | 260/79.3 M UX |
| 3,344,596 | 10/1967 | Spicer et al. | 57/140 BY X |
| 3,350,488 | 10/1967 | Breen | 57/140 BY UX |
| 3,784,399 | 1/1974 | Grot | 260/79.3 M UX |

Primary Examiner—Donald E. Watkins

[57] ABSTRACT

A woven or knitted fabric to be employed for ion exchange purposes comprises filaments of a fluorinated polymer with sulfonyl containing pendant side chains either in ionic or nonionic form whereby the filaments are supported by higher strength material prior to a weaving or knitting operation. Thereafter the supporting material is desirably removed. The final fabric may be woven so that the fabric is essentially impermeable to passage of fluids through fiber interstices or in an alternate manner is woven or knitted to allow controlled passage of liquid through fiber interstices. The polymer employed in the fabric possesses permselectivity giving desirable performance in electrolytic as well as membrane ion exchange and reverse osmosis devices.

11 Claims, No Drawings

KNITTED OR WOVEN ION EXCHANGE FABRIC CONTAINING LOW DENIER FILAMENTS

BACKGROUND OF THE INVENTION

Fluorinated polymers with pendant side chains containing ion exchange groups in the form such as sulfonic acid are known in the prior art. These resins are particularly useful where it is necessary to have thermal and chemical stability, e.g., for use as a membrane or a diaphragm in an electrolytic chlor-alkali cell. Suitable disclosures of ion exchange polymers are set forth in U.S. Pat. Nos. 3,773,634 and 3,793,163 wherein films are employed in a chlor-alkali cell for formation of chlorine and caustic. A teaching of use of an ion exchange polymer in a porous diaphragm for formation of chlorine and caustic is disclosed in U.S. Pat. No. 3,775,272.

SUMMARY OF THE INVENTION

The present invention is directed to formation of knitted and woven ion exchange fabrics formed from filaments of a fluorinated polymer containing pendant side chains in the $SO_2X$ form wherein X represents fluorine or chlorine and preferably fluorine. Conversion of the sulfonyl groups of the polymer to ionic form takes place whereby the polymer has ion exchange properties.

It is highly desirable for many applications that a thick film or a thick filament not be employed. For example, with thick gauges in a film or filament the resulting material will be thicker, heavier, more costly and generally will possess higher electrical resistance. Additionally, in use such as in a chlor-alkali cell, a penalty in operation may be imposed due to a lower current efficiency. To overcome these disadvantages, the amount of polymer for a unit area is most desirably minimized.

It is set forth in my copending application Ser. No. 430,754 filed Jan. 4, 1974 that it is possible to form a tightly woven fabric with minimum passage of liquid through fiber interstices. The use of a fabric overcomes limitations in a film whereby the physical strength of the film is unduly low. Also, in a film, a tear or perforation may quickly progress in length which is characteristic of many low gauge films.

The present invention encompasses the tightly woven fabrics set forth in my copending application Ser. No. 430,754. Additionally, the formation and use of woven or knitted fabrics is included which allow passage of liquid through fiber interstices.

The present invention permits the use of knitted and woven fabrics and overcomes an inherent weakness of low strength filaments. In weaving and/or knitting operations, a higher strength supporting material is employed with the ion exchange polymer precursor or the ion exchange polymer in filament form. Most desirably, a supporting filament is twisted with the filament comprising the ion exchange polymer precursor or ion exchange polymer. However, alternate manners of support are possible. Illustratively, a coating which imparts strength may be applied to the filament.

The high strength supporting material permits the weaving or knitting operation as if the fluorinated polymer possessed high strength. Thereafter, the high strength filament may be destroyed either before or at the time the ion exchange polymer is utilized.

DETAILED DESCRIPTION OF THE INVENTION

A fluorinated polymer with terminal sulfonyl groups present in the $-SO_2X$ form with X representing fluorine or chlorine and preferably fluorine represents the starting polymer which is formed into filaments. Illustratively, starting or precursor ion exchange polymers are set forth in Connolly et al. U.S. Pat. No. 3,282,875 and Grot U.S. Pat. No. 3,718,627. While it is highly desirable that the filament be supported when the sulfonyl groups are in the $-SO_2X$ form, nevertheless it is within the scope of the invention to have the sulfonyl groups in ionic form at the time of the weaving or knitting operation.

With the fluorinated polymer in the $-SO_2X$ form at the time of supporting operation, less difficulty is generally introduced into the weaving or knitting operation. Illustratively, in many instances with the polymer in ionic form, the filaments are more brittle and are more difficult to weave or knit into a uniform product. The fluorinated polymer with terminal groups in $-SO_2X$ form with X representing fluorine or chlorine is melt processable, i.e., it can be extruded and worked by application of elevated temperature. In contrast, the fluorinated polymer with sulfonyl groups in ionic form generally cannot be melt processed. Additionally, if a tightly woven fabric is necessary, the supporting operation with the high strength reinforcing material should take place prior to the conversion of the fluorinated polymer to ionic form.

By ionic form is denoted that the sulfonyl group will carry a negative charge under the conditions of ion exchange as opposed to covalent bonding present in the sulfonyl halide ($-SO_2X$) form. Included within this definition of ionic form are sulfonyl groups which will convert to ionic form by splitting off of a hydrogen ion (under suitable pH conditions). An example of an ionizable group which will split off a hydrogen ion is a sulfonamide group (e.g., see Resnick and Grot, U.S. patent application Ser. No. 406,361 filed Nov. 16, 1973).

The denier (dry basis) of the filaments of fluorinated polymer with sulfonyl groups in $-SO_2X$ form or in ionic form will be less than 400. With a high denier and use of a supporting material, less care is necessary in the weaving or knitting operation to prevent breaks. A preferred denier (dry basis) is below 200 (and preferably above 50) in order to minimize the amount of polymer. Generally, it is not possible to directly weave or knit these fluorinated polymer filaments without excessive filament breakage. Use of the high strength supporting material overcomes the breakage problem.

The techniques of supporting the fluorinated polymer filaments are varied. A preferred manner is by twisting a high strength, low denier filament with the fluorinated polymer filament. Illustratively, a polyester, a polyamide (e.g., nylon) or a metal filament may serve as the supporting filament. Another technique is to coat the high strength supporting material onto the fluorinated polymer filament. Illustratively, the fluorinated polymer may be drawn through a bath of molten polymer for the coating application.

As employed herein, fluorinated polymer denotes a polymer with a backbone fluorocarbon chain which has sulfonyl groups attached either directly to a main fluorocarbon chain of the polymer or to a fluorocarbon side chain attached to a main chain, and where either the main chain or a side chain (or both) may contain ether oxygen atoms.

The intermediate polymers are prepared from monomers which are fluorine substituted vinyl compounds. The polymers are made from at least two monomers with at least one of the monomers coming from each of the two groups described below. The first group comprises fluorinated vinyl compounds such as vinyl fluoride, hexafluoropropylene, vinylidene fluoride, trifluoroethylene, chlorotrifluoroethylene, perfluoro(alkyl vinyl ether), tetrafluoroethylene and mixtures thereof.

The second group is the sulfonyl containing monomers containing the precursor $-SO_2F$ or $-SO_2Cl$. One example of such a comonomer is $CF_2=CFSO_2F$. Additional examples can be represented by the generic formula $CF_2=CFR_fSO_2F$ wherein $R_f$ is a bifunctional perfluorinated radical comprising 2 to 8 carbon atoms. The particular chemical content or structure of the radical linking the sulfonyl group to the copolymer chain is not critical and may have fluorine, chlorine or hydrogen atoms attached to the carbon atom to which is attached the sulfonyl group. If the sulfonyl group is attached directly to the chain, the carbon in the chain to which it is attached must have a fluorine atom attached to it. The $R_f$ radical of the formula above can be either branched or unbranched, i.e., straight chained and can have one or more ether linkages. It is preferred that the vinyl radical in this group of sulfonyl fluoride containing comonomers be joined to the $R_f$ group through an ether linkage, i.e., that the comonomer be of the formula $CF_2=CFOR_fSO_2F$. Illustrative of such sulfonyl fluoride containing comonomers are

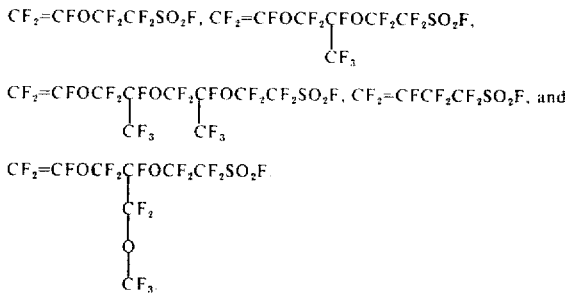

The most preferred sulfonyl fluoride containing comonomer is perfluoro(3,5-dioxa-4-methyl-7-octenesulfonyl fluoride),

The sulfonyl containing monomers are disclosed in such references as U.S. Pat. No. 3,282,875 to Connolly et al. and U.S. Pat. No. 3,041,317 to Gibbs et al. and in U.S. Pat. No. 3,718,627 to Grot.

The preferred intermediate copolymers are perfluorocarbon although others can be utilized as long as there is a fluorine atom attached to the carbon atom which is attached to the sulfonyl group of the polymer. The most preferred copolymer is a copolymer of tetrafluoroethylene and perfluoro(3,6-dioxa-4-methyl-7-octenesulfonyl fluoride) which comprises 10 to 60 percent, preferably, 25 to 50 percent by weight of the latter.

The intermediate copolymer is prepared by general polymerization techniques developed for homo- and copolymerizations of fluorinated ethylenes, particularly those employed for tetrafluoroethylene which are described in the literature. Nonaqueous techniques for preparing the copolymers of the present invention include that of U.S. Pat. No. 3,041,317, issued to H. H. Gibbs and R. N. Griffin on June 26, 1962; that is, by the polymerization of a mixture of the major monomer therein, such as tetrafluoroethylene, and a fluorinated ethylene containing sulfonyl fluoride in the presence of a free radical initiator, preferably a perfluorocarbon peroxide or azo compound, at a temperature in the range of 0°–200°C. and at pressures in the range 1–200, or more, atmospheres. The nonaqueous polymerization may, if desired, be carried out in the presence of a fluorinated solvent. Suitable fluorinated solvents are inert, liquid, perfluorinated hydrocarbons, such as perfluoromethylcyclohexane, perfluorodimethylcyclobutane, perfluorooctane, perfluorobenzene and the like.

Aqueous techniques for preparing the intermediate copolymer include contacting the monomers with an aqueous medium containing a free-radical initiator to obtain a slurry of polymer particles in non-water-wet or granular form, as disclosed in U.S. Pat. No. 2,393,967, issued to M. M. Brubaker on Feb. 5, 1946; contacting the monomers with an aqueous medium containing both a free-radical initiator and a telogenically inactive dispersing agent, to obtain an aqueous colloidal dispersion of polymer particles, and coagulating the dispersion, as disclosed, for example, in U.S. Pat. No. 2,559,752 issued to K. L. Berry on July 10, 1951, and U.S. Pat. No. 2,593,583 issued to J. F. Lontz on Apr. 22, 1952.

The intermediate polymer is formed into a filament by conventional techniques such as extrusion melt spinning. Such extrusion melt spinning is well known in the prior art and conventional techniques are suitable in the present case. In the melt spinning operations, an increase in length during the drawing operation conventionally occurs such as of the order of 50 to 400 percent wherein the diameter is reduced. By this fashion, an orientated fiber is obtained in the drawing operation.

The intermediate fluorinated polymer which is formed into a filament desirably is supported by a high strength material prior to a weaving or knitting operation. The filament comprising a fluorinated polymer generally will not be of high strength. Where a tight weave is required such as disclosed in my copending patent application Ser. No. 430,754, use of thick filament will result in a heavy fabric which results in added weight and higher electrical resistance. The present disclosure by employment of the high strength supporting material allows the desired weaving into the final fabric form.

The types of supporting materials are varied which are suitable in the present disclosure. Generally, the supporting material will have a high strength to volume ratio in comparison to the fluorinated polymer. Illustratively, in employment of a supporting filament, a strong low denier supporting filament is desirable. Suitable supporting materials include polyamides (such as nylons), polyesters and metals. Since the supporting materials will not have the ion exchange properties in the manner of the fluorinated polymer with groups in ionic form, it is most desirable that the supporting material be destroyed after weaving or knitting. The destruction of the supporting material eliminates interference with ion exchange properties of the fabric.

The manner of destruction of the reinforcing material is varied and will be dependent on the reinforcing material and the state of the fluorinated polymer, i.e., sulfonyl groups in —SO₂X or ionic form. Illustratively, with sulfonyl groups in —SO₂X form, acid conditions may be employed to destroy the filaments. Illustratively, a supporting material of metal may be destroyed.

If caustic conditions will cause destruction of the supporting material, destruction of this material and conversion of the sulfonyl groups (—SO₂X) of the fluorinated polymer to ionic form may take place simultaneously.

In another manner of destruction of the supporting material, the intermediate fluorinated polymer may be first converted to ionic form. This conversion may be undertaken by conventional techniques. Thereafter, the supporting filament may be destroyed by either an acid or caustic.

It is also possible to cause destruction of the supporting filament at the time of use of the fabric for ion exchange purposes. Illustratively, in a chlor-alkali cell, caustic conditions may remove the supporting material. In this event, the supporting material will serve as reinforcement until the time of actual employment of the fabric for its intended use.

It is desirable in many instances that the final article fabricated from the fabric be essentially impermeable to physical passage of liquids between the fabric strands. Water will swell the polymer and will diffuse directly through the polymer in ionic form. However, the construction of a tightly woven fabric minimizes passage between the interstices of the fabric of undesired components, e.g., salt passage into caustic formation of caustic and chlorine from a brine solution.

As employed herein, essentially impermeable denotes the ability of the woven fabric to pass at most a limited quantity of water. More specifically, the term denotes the passage of less than 100 ml of water through a square inch of fabric exposed to a vertical head of 19 inches of water during a 60-hour time period. The fabric is preconditioned prior to the test procedure by soaking in boiling water for one-half hour.

Upon conversion to the final polymer, shrinkage of the fiber takes place in the longitudinal direction while swelling of the fiber occurs along its width which causes the impermeability of the final woven fabric.

For purposes of explanation only as set forth in my copending application Ser. No. 430,754, it is considered that the final polymer in ionic form has a memory compared to the individual film from the intermediate fabric. In other words, in the melt spinning in a drawing operation, an increase in the length of the fiber takes place with a decrease in the diameter of this intermediate polymer form. It is considered upon conversion of the polymer to ionic form that the polymer remembers its original dimensions before the drawing operation and attempts to return to this state. The polymer shrinks along its longitudinal direction but in contrast swells along the fiber diameter. For all practical purposes, the volume of the fiber does not change greatly, if at all, but the physical volume is redistributed and swelling along the width denotes that the fiber is thicker in the final woven fabric. Therefore, the physical property of the final fabric of essential impermeability to the flow of liquids is realized, and the important utility of the invention is obtained wherein high strength is obtained in comparison to films of the polymer per se.

In an alternate manner, the intermediate polymer may be converted to ionic form prior to removal of the reinforcing material.

The exact technique employed will be dependent upon utility of the final article. More specifically, if a tightly woven fabric is necessary, the removal of the reinforcing material will take place before the polymer in its precursor form (sulfonyl groups present as —SO₂X) is converted to the ionic form. However, if a fabric either woven or knitted is desired which is to contain spaces between the fibers, conversion may be undertaken to ionic form prior or after removal of the supporting material.

Conversion of the intermediate polymer to the ionic form will be by chemical reaction of the sulfonyl groups of the intermediate polymer.

The sulfonyl groups of the intermediate polymer may be converted from the —SO₂X form to the form of —(SO₂NH)$_m$Q, wherein Q is selected from the group consisting of H, cation of an alkali metal and cation of an alkaline earth metal and $m$ is the valence of Q or to the form of —(SO₃)$_n$Me, wherein Me is a metallic cation, H, or NH₄ and $n$ is the valence of Me.

In the above definition, preferred members include cations of alkali metals such as sodium or potassium.

For conversion of the intermediate sulfonyl groups to the —(SO₂NH)$_m$Q form wherein Q is H, contact may be undertaken with anhydrous ammonia in liquid or gaseous form. Conversion to Q as a cation of an alkali metal or alkaline earth metal may involve contact with the hydroxide of the cation of the alkali metal or cation of the alkaline earth metal.

Illustratively, conversion of the —SO₂F groups to —SO₂NH₂ may take place by contact with anhydrous ammonia which can be in the gaseous form, the liquid form, as a mixture with air or other gases which will not react with the sulfonyl group or the remaining portion of the polymer or ammonia in a solvent which is nonaqueous and which is nonreactive with the polymer.

To convert the sulfonyl groups in —SO₂X form to —(SO₃)$_n$Me form, the intermediate polymer may be contacted with a hydroxide of the metallic cation such as sodium hydroxide. In specific instances of Me, it may be necessary to form —SO₃Na by reaction with sodium hydroxide followed by ion exchange with a solution of the salt of the desired Me.

Suitable disclosures of conversion from the intermediate to the final polymer are set forth in U.S. Pat. No. 3,282,825 and U.S. Pat. No. 3,770,567.

To further illustrate the innovative aspects of the present invention, the following Examples are provided.

EXAMPLE 1

A copolymer of tetrafluoroethylene and

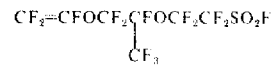

(mole ratio of 7.5:1) was extruded at a temperature of 280°C. downwards through a 13 hole spinneret with a take off speed of 250 yards per minute. The yarn was then drawn at a rate of 1000 yards per minute over a pipe heated to about 150°C. resulting in a 300 percent elongation. The yarn bundle thus obtained had a thickness of about 2.5 mils while the 13 individual fibers have a thickness of 0.7 mil. For the subsequent weaving, one strand of this yarn was plied together with a 15-denier nylon filament.

Thereafter, the yarn was woven into a plain weave with a thread count of 120. The nylon monofilament in the fabric was destroyed by a treatment with a 1:1 mixture of 37 percent hydrochloric acid and acetic acid. This treatment caused a decrease in both length and width of the fabric of about 7 percent and microscopic examination revealed the voids left by the removal of the nylon monofilament. The fabric was then converted with the sulfonyl group in $-SO_3K$ form by treating with a solution containing 10 percent KOH and 30 percent DMSO at 70°C. for 5 hours. After washing with water and air drying the fabric showed a total shrinkage of 32 percent in length and 25 percent in width.

Microscopic examination showed that the voids left the removal of the nylon have been closed.

EXAMPLE 2

The disclosure of Example 1 was directly followed except the chemical treatment conditions were reversed. In other words, the sulfonyl groups in the fabric were converted to $-SO_3K$ form prior to destruction of the nylon filament with hydrochloric acid and acetic acid.

The yarn had a wrinkled appearance which upon microscopic examination showed voids left by the removal of the nylon.

Although the invention has been described by way of specific embodiments, it is not intended to be limited thereto. As will be apparent to those skilled in the art, numerous embodiments can be made without departing from the spirit of the invention or the scope of the following claims.

What is claimed is:

1. A fabric comprising filaments of a fluorinated polymer containing sulfonyl groups in $-SO_2X$ form with X selected from the group consisting of fluorine and chlorine, the filaments having a denier of no more than 400 and being individually supported by a material which serves to strengthen said filaments.

2. The fabric of claim 1 wherein said fluorinated polymer filaments are in the range of 50 to 200 denier.

3. The fabric of claim 1 wherein said material is in the form of filaments individually twisted about the fluorinated polymer filaments.

4. The fabric of claim 1 wherein said filaments are selected from the group of polyester, polyamide or metal.

5. The fabric of claim 1 which is woven.

6. A fabric comprising filaments of a fluorinated polymer containing sulfonyl groups in ionic form, the filaments having a denier of no more than 400 and being individually supported by a material which serves to strengthen said filaments.

7. The fabric of claim 6 wherein said sulfonyl groups in ionic form are selected from the group consisting of $-(SO_2NH)_mQ$ wherein Q is H, cation of an alkali metal or cation of an alkaline earth metal and $m$ is the valence of Q or $(-SO_3)_nMe$ where Me is a metallic cation, H or $NH_4$, and $n$ is the valence of Me.

8. The fabric of claim 6 wherein said fluorinated polymer filaments are in the range of 50 to 200 denier.

9. The fabric of claim 6 wherein said material is in the form of filaments individually twisted about the fluorinated polymer filaments.

10. A woven fabric comprising filaments of a fluorinated polymer containing sulfonyl groups in ionic form, the filaments having a denier of no more than 200; said fabric having the ability to pass less than 100 ml of water through a square of said fabric exposed to a vertical head of 19 inches of water during a 60-hour time period.

11. The fabric of claim 10 wherein said sulfonyl groups in ionic form are selected from the group consisting of $-(SO_2NH)_mQ$ wherein Q is H, cation of an alkali metal or cation of an alkaline earth metal and $m$ is the valence of Q or $(-SO_3)_nMe$ where Me is a metallic cation, H or $NH_4$ and $n$ is the valence of Me.

* * * * *